US008682786B2

(12) United States Patent
Li et al.

(10) Patent No.: US 8,682,786 B2
(45) Date of Patent: Mar. 25, 2014

(54) METHOD AND SYSTEM FOR PAYMENT BASED ON CORRELATION BETWEEN PRODUCT SPECIFIC INFORMATION AND TERMINAL NUMBERS

(71) Applicant: BroadDeep (Beijing) Network Technology Co., Ltd, Beijing (CN)

(72) Inventors: Qiang Li, Beijing (CN); Mingjie Qian, Beijing (CN)

(73) Assignee: Broaddeep (Beijing) Network Technology Co., Ltd., Beijing (CN)

( * ) Notice: Subject to any disclaimer, the term of this patent is extended or adjusted under 35 U.S.C. 154(b) by 0 days.

(21) Appl. No.: 13/746,122

(22) Filed: Jan. 21, 2013

(65) Prior Publication Data
US 2013/0191275 A1 Jul. 25, 2013

(30) Foreign Application Priority Data
Jan. 21, 2012 (CN) .......................... 2012 1 0019677

(51) Int. Cl.
*G06Q 40/00* (2012.01)
(52) U.S. Cl.
USPC .............................................. 705/39; 705/40
(58) Field of Classification Search
USPC ....................................................... 705/10–44
See application file for complete search history.

(56) References Cited

U.S. PATENT DOCUMENTS

| 7,308,424 B2 * | 12/2007 | Urabe ......................... 705/26.35 |
| 7,742,994 B1 * | 6/2010 | Gupta ............................. 705/64 |
| 7,827,115 B2 * | 11/2010 | Weller et al. .................... 705/78 |
| 7,970,705 B2 * | 6/2011 | Patterson ........................ 705/44 |
| 8,005,737 B2 * | 8/2011 | Hammad ......................... 705/35 |
| 8,271,395 B2 * | 9/2012 | Dominguez et al. ............ 705/65 |
| 8,332,325 B2 * | 12/2012 | Faith et al. ...................... 705/50 |

(Continued)

FOREIGN PATENT DOCUMENTS

| CN | 1635506 A | 7/2005 |
| CN | 1946108 A | 4/2007 |
| CN | 102164352 A | 8/2011 |
| CN | 102609837 | 7/2012 |

OTHER PUBLICATIONS

International Search Report and Written Opinion dated Nov. 8, 2012 for corresponding International Application No. PCT/CN2012/000120, filed Jan. 21, 2012.

*Primary Examiner* — Frantzy Poinvil
(74) *Attorney, Agent, or Firm* — The Patentwise Group, LLC

(57) ABSTRACT

The invention provides a method for making payment based on correlation between product specific information and terminal numbers and a system for implementing the method. The method involves providing product specific information representing payment information for goods selected by a user from a web service, dispatching the product specific information for the selected goods to the user, receiving a payment request message containing the product specific information from a terminal device of the user, obtaining the product specific information from the payment request message, obtaining a terminal number associated with the terminal device of the user from a communication network, and providing the correlation information to a payment platform, wherein the terminal number represents identification information of the user and may be used by the payment platform for search for an account of the user, and the product specific information may be used by the payment platform to deduct payment from the account of the user. By obtaining terminal number from the communication network and correlating the terminal number with product specific information, the invention allows a user to perform a one-click payment, thereby simplifying payment procedures involved in web services.

10 Claims, 5 Drawing Sheets

(56) References Cited

U.S. PATENT DOCUMENTS 8,355,987 B2 * 1/2013 Hirson et al. .................. 705/40
8,396,455 B2 * 3/2013 Carlson et al. ............. 455/412.2
8,401,908 B2 * 3/2013 Bildmayer et al. .......... 705/26.1
8,407,124 B2 * 3/2013 Uehara et al. .................. 705/35

* cited by examiner

METHOD AND SYSTEM FOR PAYMENT BASED ON CORRELATION BETWEEN PRODUCT SPECIFIC INFORMATION AND TERMINAL NUMBERS

This application claims priority under 35 U.S.C. §119 to Chinese Patent Application 201210019677.0, the entire disclosure of which is hereby incorporated by reference as if set forth fully herein.

BACKGROUND OF THE INVENTION

1. Field of the Invention

The invention relates to web technology and, in particular, to on-line payment technology for web services.

2. Description of the Related Technology

There are three types of on-line payment techniques for web services at present. The first type involves bundling user accounts with bank cards and making payments after logging in. Specifically, a user provides bank card details at the time of registering an account for a web service. A payment platform of the web service stores bundling information related to the registered account and the bank card details. When the user needs to make on-line payments, the user first logs in for the web service using the registered account; after the user has selected goods to purchase, the payment platform searches for relevant bank card details based on the account and the bundling information; and payments can then be made from the relevant bank card. Apple™ Inc. uses this technology for its APP Store.

The second type relies on a third party payment platform to make payments. Specifically, a user does not need to provide bank card details when registering an account for web service. When making an on-line payment, the user first logs in for the web service using his account; after the user has selected goods to purchase, the session is switched to a gateway of a third party payment platform; when the user has entered his user name (e.g. a bank card number) and pin (e.g. password for payment using the bank card) etc., payment is carried out through the third party payment platform.

The third type relies on bundling between a mobile terminal number and user account information. Specifically, when a user registers for a web service, a mobile terminal number of the user's is bundled with his account information. When making an on-line payment, the user needs to enter his password and confirm the transaction using a mobile terminal device correlated with the mobile terminal number. A payment platform performs the payment based on the bundling information, the mobile terminal number, the password and confirmation information.

The first type of on-line payment technique requires a user to provide bank card details when registering an account and thereby complicates the user registration process, and users often chooses not to register due to security concerns or merely because of the complexity of the registration process. The second type of payment technique requires a user to enter a user name and pin etc. and thereby complicates the payment process. The third type of payment technique requires a user to provide his mobile terminal number and involves password entry and transaction confirmation when making a payment. Like the second type of payment technique, the third payment technique also complicates the payment process. Therefore, the existing payment technology hinders development of web based services to some extent.

Additionally, with rapid development of mobile communication technology, more and more people start to use mobile based web services. However, when users access web services using their mobile phones, it is difficult for web service providers to obtain the users mobile phone numbers and therefore not able to simplify payment processes by taking advantage of existing payment arrangements for mobile communication services. As a result, many good web services can only be offered to users for free. This is not good for the development of web-based services in the long run.

In view of the above-listed problems, the inventor has devised a new payment method and system based on correlation between product specific information (for selected goods/services) and mobile terminal numbers, which can simplify on-line payment process.

SUMMARY OF THE INVENTION

An object of the invention is to over come the defects of the existing on-line payment technologies and provide a new payment technology based on correlation between product specific information (for selected goods/services) and mobile terminal numbers which simplifies on-line payment process and facilitates development of e-commerce and long term development of web-based businesses.

In order to achieve the objective discussed above, the invention provides the following technical solutions.

There is provided a method for making a payment based on correlation between product specific information and terminal numbers, comprising: providing product specific information representing payment information for goods selected by a user from a web service; dispatching the product specific information for the selected goods to the user; receiving a payment request message containing the product specific information, the payment request message sent by the user from a terminal device of the user; obtaining the product specific information from the payment request message; obtaining a terminal number associated with the terminal device of the user from a communication network; and correlating the terminal number and the product specific information and providing the correlation information to a payment platform, wherein the terminal number represents identification information of the user and may be used by the payment platform to search for an account of the user, and the product specific information may be used by the payment platform to deduct payment from the account of the user.

Preferably, the product specific information comprises at least one of fee information, product information, manufacturer information, labeling information and discount information for the selected goods.

Preferably, the product specific information is conveyed in the payment request message in an encrypted format, in a token, or in a payment certificate. Preferably, the terminal number comprises a mobile phone number, an International Mobile Subscriber Identification (IMSI) number, an International Mobile Equipment Identity (IMEI) number, an Asymmetric Digital Subscriber Line (ADSL), or a Wireless Local Area Networks (WLAN) account.

Preferably, the communication network comprises General Packet Radio Service (GPRS) core network, a Code Division Multiple Access (CDMA) packet switch service node, a Packet Data Serving Node (PDSN) core network, an advanced (Long Term Evolution) LTE network, a DSLAN/Broadband Remote Access Server (BRAS)/Radius network, or a Wireless Local Area Network (WLAN) AC (Access Controller)/AP (Access Point)/BRAS (Broadband Remote Access Server)/Radius (Remote Authentication Dial In User Service) network.

Preferably, said obtaining a terminal number comprises: providing the terminal number by an existing network device in the communication network; or inspecting data packets transmitted in the communication network by a deep packet inspection (DPI) device provided in the communication network based on a splitter or mirror image technique, and obtaining the terminal number from inspected user instruction packets.

Preferably, the network device comprises a Gateway GPRS Support Node (GGSN), a Packet Data Serving Node (PDSN), a Radius, or a Wireless Application Protocol (WAP) gateway.

There is also provided a payment system based on correlation between product specific information and terminal numbers, comprising: a product specific information providing module for providing a user with product specific information representing payment information for goods selected by the user from a web service; a dispatching module for dispatching the product specific information for the selected goods to the user; an correlating module for receiving a payment request message sent by the user from a terminal device of the user, the payment request message containing the product specific information, obtaining the product specific information from the payment request message, obtaining a terminal number correlated with the terminal device of the user from a communication network, correlating the terminal number and the product specific information, and providing the correlation information to a payment platform, wherein the terminal number represents identification information of the user and may be used by the payment platform to search for an account of the user, and said product specific information may be used by the payment platform to deduct payment from the account of the user.

Preferably, the product specific information providing module comprises: a request sub-module for, after receiving a request message from the dispatching module requesting product specific information for user selected goods, generating product specific information representing payment information for the selected goods and outputting the product specific information to the dispatching module; and a storage sub-module for storing the product specific information output by the request sub-module.

Preferably, the payment platform comprises a mobile payment platform, a bank payment platform, or a third party payment platform.

The method and system for on-line payment based on correlation between product specific information and terminal numbers as discussed above are advantageous in that by dispatching product specific information for selected goods, obtaining user terminal number from the network side, correlating user terminal number with product specific information contained in a payment request message, and providing the correlation information to a payment platform, a user may select goods for purchase and initiate a secure on-line payment process at a click on a buy button. There is no need for entering user account information, mobile terminal number, passwords, bank card details etc. Accordingly, the invention can simplify the whole on-line payment process for users and facilitate development of e-commerce and web-based businesses.

The preceding passages merely provide a summary of the invention. The solution provided by the invention, the technical features involved and the advantages achieved will be discussed in greater detail below with reference to the accompanying drawings.

DETAILED DESCRIPTION OF THE PREFERRED EMBODIMENT(S)

With reference to the accompanying drawings of the specification and specific embodiments, the invention will be described in detail below. It should be understood that the specific embodiments described below only serve to explain the present invention, but are not meant to limit the scope of the present invention.

Embodiment 1

Figure 1:
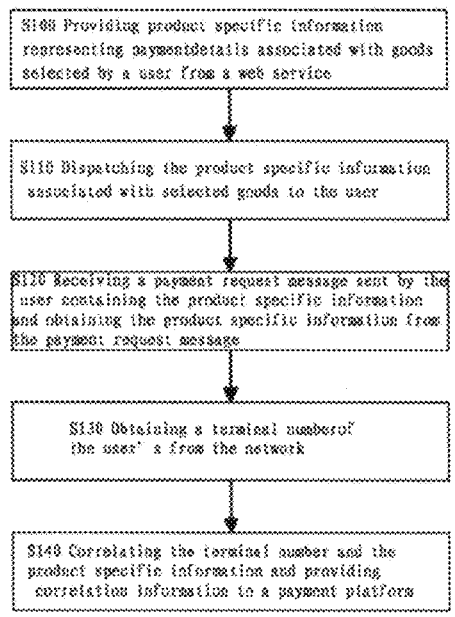
FIG. 1 is a flow chart showing a method for making a payment based on correlation between product specific information and terminal numbers in accordance with the invention.

A Method for Making a Payment Based on Correlation Between Product Specific Information and Terminal Numbers FIG. 1 shows a flow diagram of the method At step S100 in FIG. 1, product specific information representing payment information for goods selected by a user from a web service is provided to the user.

The product specific information is composed specifically for goods selected from a web service by the user. According to the invention, the product specific information representing payment information for the selected goods is provided for the user in response to a request of a web service provider platform. The product specific information may be generated based on a request message from the web service provider platform at the time when the platform requests product specific information for goods selected by the user. The product specific information may be stored after it is generated and may be returned to web service provider platform.

In accordance with the present invention, a piece of product specific information corresponds to a particular item of goods. One particular item of goods may correspond to the same product specific information or different product specific information in different transactions. Preferably, the product specific information corresponding to a particular item of goods in one transaction differs from the product specific information corresponding to the particular item of goods in another transaction, even if the transactions are performed by the same user.

An item of goods may comprise a single product or multiple individual products. For example, a collection of books may be sold as one item of goods.

Because the product specific information represents payment information for selected goods, the product specific information may be used by a payment platform for calculating fees of transactions. The product specific information may directly include fee information for the goods. Additionally or alternatively, the product specific information may include at least one of product information (e.g. name of products), manufacturer information, labelling information for the goods (e.g. identification of the goods) and discount information.

The product specific information may take different presentation forms. For example, the product specific information may be encrypted information, token information, payment certificate form information, or numeric or alphabetic strings.

As a specific example, when the product specific information takes the form of a payment certificate, the payment certificate may include: product identification in the web service, information about the web service provider (e.g. SP identification), effective time of contract, expiry time of contract, random values, encryption keys, etc. The payment certificate may be an X.809 certificate.

At step S110, the product specific information corresponding to the selected goods is dispatched to the user.

The product specific information may be sent to a terminal device of the user. For example, the web service provider platform may receive the product specific information from the payment platform and transmit the product specific information to the user terminal device.

The user terminal device receives the product specific information and may embed the product specific information in a payment request message and transmit the payment request message to the web service provider platform.

In actual implementation (e.g. calls or short message applications by mobile phones), messages transmitted by a terminal device do not normally contain a terminal number of the terminal device (e.g. a mobile phone number or use identification information), unless there is special processing involved at the terminal device, e.g. software embedded at the terminal device obtaining the terminal device number and inserting the number in messages transmitted by the terminal device (e.g. a payment request message). In the present invention, there is no requirement for the terminal device to insert the terminal number in the payment request message.

The terminal number may be a mobile phone number, an International Mobile Subscriber Identification (IMSI) number, an International Mobile Equipment Identity (IMEI) number, an Asymmetric Digital Subscriber Line (ADSL) account, or a Wireless Local Area Networks (WLAN) account. The present invention is not limited to using any particular form of terminal numbers.

At step S120, the payment request message transmitted by the user containing the product specific information is received from the terminal device, and the product specific information is extracted from the payment request message.

The present invention inspects data (e.g. data packets) transmitted by the communication network (e.g. the core network of the packet switch mobile communication network) by means of deep packet inspection to obtain signals containing the product specific information (e.g. payment request message contained in user data packets), so as to obtain the product specific information contained in the payment request message. In one example, data packets transmitted in the communication network are branched off by means of a splitter or mirror image technique. Branched data packets are inspected, and product specific information is obtained from payment request messages.

At step S130, the terminal number of the user is obtained from the communication network.

In one example, the terminal number is supplied by an existing communication network device. In another example, a new device is used to inspect (e.g. by decoding) data packets (e.g. input/output data packets of an existing communication network device) transmitted in the communication network so as to obtain the terminal number from the data packets. The device used to inspect the data packets may be a DPI device on a segment of the network branched off by a splitter or a mirror imaging device. Other techniques for obtaining the terminal number may be used.

Because the present invention uses a terminal number automatically obtained from the communication network, automatic recognition of a user's terminal numbers may be performed in the payment process.

As in normal communication of the terminal device, the user's terminal number may be obtained in normal communication by existing network devices in the communication network. The present invention may obtain the terminal number conveniently from the existing communication network devices without altering normal operation of the existing communication network devices.

The communication network involved in the present invention may be a 2G/3G GPRS core network, a CDMA PDSN core network, a 4G LTE network, a DSLAN/BRAS/Radius network or a WLAN network such as AC/AP/BRAS/Radius, etc. The network devices may be a GGSN, a PDSN, a Radius or a WAP gateway. The invention is not limited to using the above mentioned devices.

At step S140, the obtained terminal number and the product specific information contained in the payment request message are correlated, and the correlation information is provided to the payment platform.

The terminal number and the product specific information may be bundled together or configured to point to each other in accordance with a certain rule. Information representing the correlation may then be provided to the payment platform. In this manner, the payment platform may search for the user's account based on the terminal number in the correlation information and determine the amount of payment based on the product specific information, and deduct a corresponding amount from the user's account.

If the product specific information is encrypted, the payment platform may use a default encryption key or an encryption key contained in the correlation information to decipher the product specific information and then deduct the corresponding amount from the user's account based on the deciphered product specific information.

The above-mentioned payment platform may be an existing payment platform, e.g. a mobile payment platform, a bank payment platform, or a third party payment platform. The corresponding user's account may be a mobile phone account of the user (e.g. a pre-paid phone account or credit phone account), a bank account of the user or an account of the user in the third party payment platform.

Embodiment 2

Figure 2:
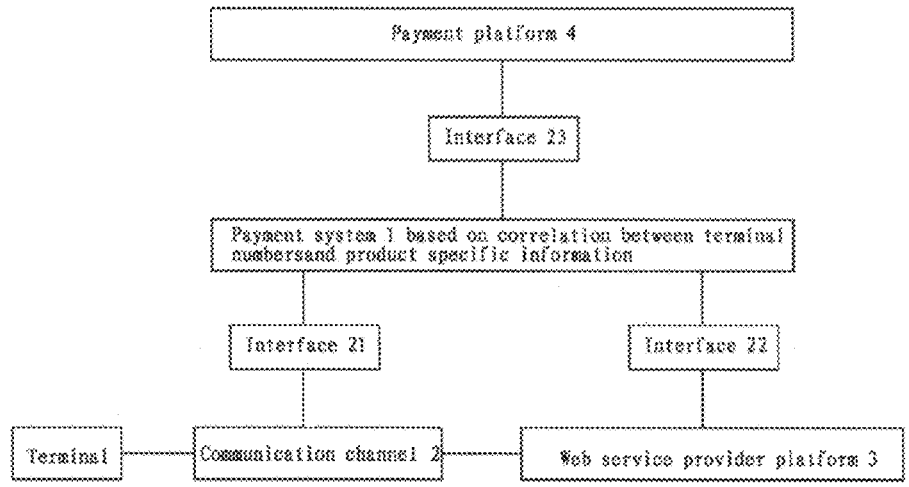
FIG. 2 is a diagram illustrating the location of a system for making a payment based on correlation between product specific information and terminal numbers in accordance with the invention within an on-line transaction system.
Figure 3:
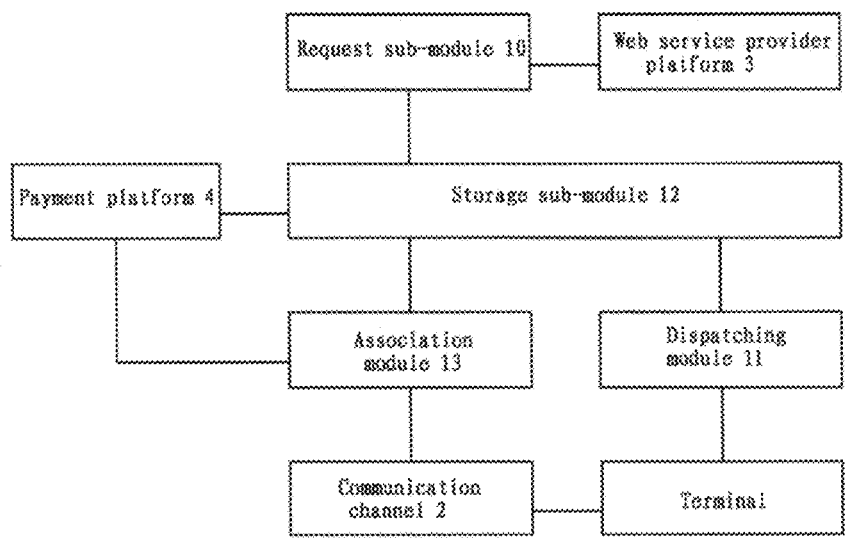
FIG. 3 is a structural diagram showing key components of a system for making a payment based on correlation between product specific information and terminal numbers in accordance with the invention.

A Payment System Based on Correlation Between Product Specific Information and Terminal Numbers FIG. 2 and FIG. 3 show such a payment system.

In FIG. 2, payment system 1 of the present invention is connected with a communication channel 2 formed by multiple communication network devices through interface 21, with web service provider 3 through interface 22, and with payment platform 4 through interface 23 (payment system 1 can access the user account corresponding to the terminal number through interface 23). Additionally, the user terminal can access web service provider platform 3 through communication channel 2.

Terminal numbers and product specific information may be transmitted between payment system 1 and communication channel 2 through interface 21; payment system 1 can perform certificate exchange and product specific information request with service provider platform 3 through interface 22. Information of correlation between product specific information and terminal numbers can be provided to payment platform 4 by payment system 1 through interface 23.

The protocol for communication adopted for interfaces 21, 22 and 23 and message format may be selected in accordance with conditions of the communication network. The communication channel 2 may include existing communication network devices that may be used to obtain users' terminal numbers. Devices that may be used for the interfaces 21-23 and the communication channel 2 are not limited to any specific types of devices.

The structure of the payment system of the present invention is shown in FIG. 3.

The payment system of FIG. 3 includes: request sub-module 10? dispatching module 11, correlation module 13 and storage sub-module 12. Storage sub-module 12 is connected with request sub-module 10 and dispatching module 11. Request sub-module 10 is also connected with web service provider platform 3. Correlation module 13 is connected with communication channel 2 and payment platform 4. Dispatching module 11 is also connected with the user terminal. Request sub-module 10 and storage sub-module 12 form a product specific information provision module.

The product specific information provision module is used for providing product specific information that represents payment information for goods selected from a web service by a user. The product specific information provision module can generate the product specific information in response to a request of web service provider platform 3 and store the generated product specific information. The product specific information provision module may be provided within payment platform 4 or independent of payment platform 4.

Upon receiving a request for product specific information corresponding to selected goods from web service provider platform 3, the request sub-module 10 of the product specific information provision module generates product specific information that represents payment information for the selected goods and sends the product specific information to dispatch module 11. Storage sub-module 12 receives and stores the product specific information from request sub-module 10. The product specific information may be stored as tables, databases or text files at storage sub-module 12. Request sub-module 10 and storage sub-module 12 may be provided at different network devices or within the same network device. For example, both request sub-module 10 and storage sub-module 12 may be provided within payment platform 4.

Request sub-module 10 may exchange information with web service provider platform 3 via HTTP?WEBSERVICE or SOCKET protocols.

Dispatch module 11 is mainly used for transmitting product specific information output by request sub-module 10 to users. A users' terminal device may embed received product specific information in payment request messages and send the payment request messages to the communication network.

Dispatch module 11 may be provided at web service provider platform 3 or independent from web service provider platform 3.

Correlation module 13 receives payment request messages send from users' terminal devices and obtains the product specific information from the payment request messages. Correlation module 13 also obtains users' terminal numbers from the communication network (e.g. from communication channel 2) and correlates the terminal numbers with the product specific information (e.g. by bundling or by using pointers). Correlation module 13 then provides the correlation information to payment platform 4.

The network device wherein correlation module 13 resides may be connected in parallel or in series with a network device in the communication channel 2 so as to obtain the users' terminal numbers via deep packet inspection.

Correlation module 13 may obtain the terminal numbers from existing network devices in the communication channel 2. Alternatively, correlation module 12 may intercept user signals transmitted in the communication network and obtain the users terminal numbers.

The correlation information provided to payment platform 4 by correlation module 13 may be: bundling information between GPRS terminal numbers (e.g. MSISDN/IMSI) and product specific information, bundling information between PDSN terminal numbers (e.g. MSISDN/IMSI) and product specific information, or bundling information between ADSL/WLAN terminal numbers (i.e. account numbers) and product specific information, etc.

Devices that supply terminal numbers to correlation module 13 may be GGSN, PDSN, Radius or WAP gateways.

Correlation module 13 may be provided within a DPI device. The DPI device may receive data packets transmitted in the communication network from a branch channel.

Payment platform 4 (e.g. a mobile payment platform, a bank payment platform or a third party payment platform) may search for users' accounts based on received terminal numbers and deduct payments from users' accounts based on the product specific information obtained from the correlation information. In this manner, on-line payment for web services may be performed at a single click of a button. The invention is not limited to any particular type of payment calculation method of payment platform 4.

Embodiment 3

Figure 4:
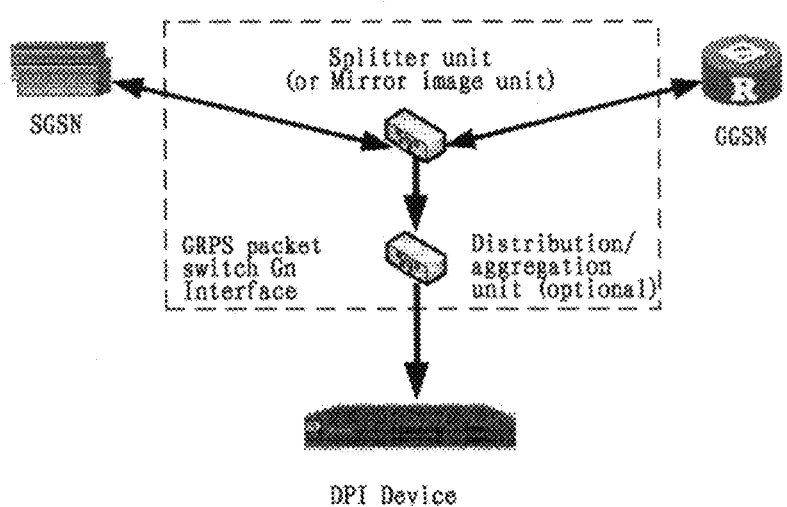
FIG. 4 is a diagram showing application of the method and system for payment based on correlation between product specific information and terminal numbers in accordance with the invention in a GPRS packet switch network.
Figure 5:
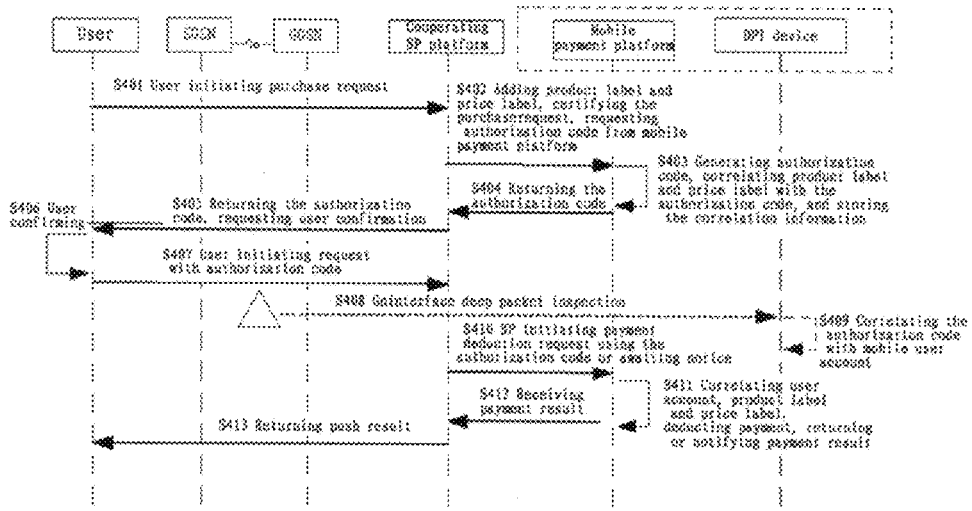
FIG. 5 is a timing diagraph corresponding to the system application of FIG. 4.

Application of the Payment Method and System of the Present Invention in GPRS Packet Switch Network As shown in FIG. 4 and FIG. 5, correlation module 13 in this embodiment mainly includes a network packet capturing unit, an instructions processing unit, a user data packet processing unit, and a correlation unit.

In FIG. 4, the interface between GGSN and SGSN in the GPRS packet switch network is called a Gn interface. The Gn interface uses a splitter or mirror image technique to replicate data streams in the communication network. The replicated data streams may be directed to the DPI device or transmitted to the DPI device via a distribution/aggregation unit.

At step S401 shown in FIG. 5, a user (i.e. a mobile communication user) may send a purchase request to cooperating service provider (SP) platform (i.e. a SP platform of mobile web services that cooperate with a mobile payment platform).

At step S402, the cooperating SP platform adds a product label and a price label for selected goods to a received purchase request and, after the purchase request has been certified, requests product specific information (e.g. authorization code) from payment platform 4. In one example, the cooperating SP platform transmits the purchase request which includes the product label and the price label to a mobile payment platform.

At step S403, the mobile payment platform generates authorization code based on the received request, correlations the product label and price label contained in the request message with the authorization code, and stores the correlation information.

At step S404, the mobile payment platform returns the authorization code to the cooperating SP platform.

At step S405, the cooperating SP platform returns the authorization code to the user and request user confirmation for the payment.

At step S406, the user confirms the payment.

At step 407, the user sends a payment request message containing the authorization code to the cooperating SP platform.

At step 408, a DPI device performs Gn interface deep packet inspection after receiving the payment request message. The deep packet inspection is performed in the following manner: the network packet capturing unit transmits instruction data packets contained in sampled data packets to the instruction processing unit; the instruction processing unit extracts the user's MSISDN, IMEI, IMSI or another form of mobile terminal number representing the user's identity; the network packet capturing unit transmits user data packets contained in sampled data packets to the user data packet processing unit; the user data packet processing unit then extracts the authorization code.

At step S409, the DPI device correlates the authorization code with the mobile terminal number, which represents the mobile user's identity, through instruction and data packet correlation unit, and stores the correlation information. The DPI device (e.g. the correlation unit) provides the correlation information to the payment platform.

At step S410, the cooperating SP platform initiates a payment deduction request to the payment platform based on the authorization code, or the cooperating SP platform awaits notification from the mobile payment platform.

At step S411, the mobile payment platform correlates the correlation information obtained at step S403 with the mobile terminal number based on the correlation information transmitted from the DPI device and generates correlation information between user identification information, product identification and price information. The mobile payment platform then deducts appropriate fees from the user's account based on the correlation information.

At step S412, the mobile payment platform returns payment deduction results to the cooperating SP platform.

At step S413, the cooperating SP platform pushes the payment deduction results to the user.

Embodiment 4

Figure 6:
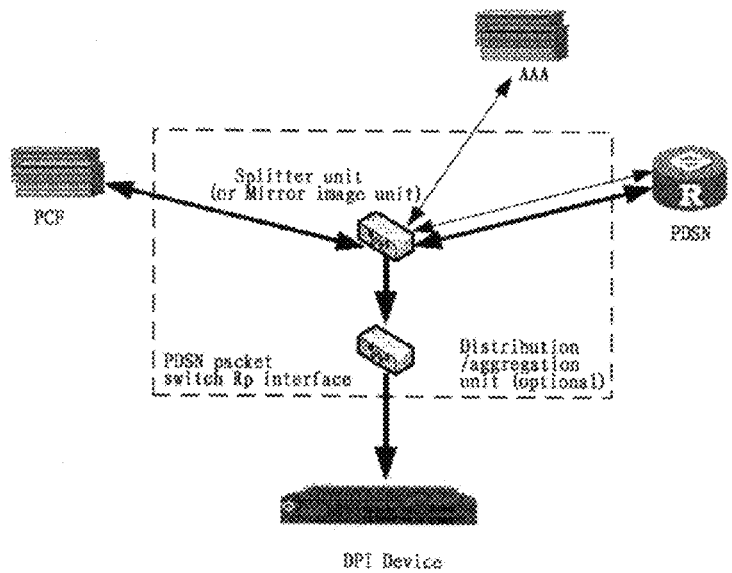
FIG. 6 is a diagram showing application of the method and system for payment based on correlation between product specific information and terminal numbers in accordance with the invention in a PDSN packet switch network.
Figure 7:
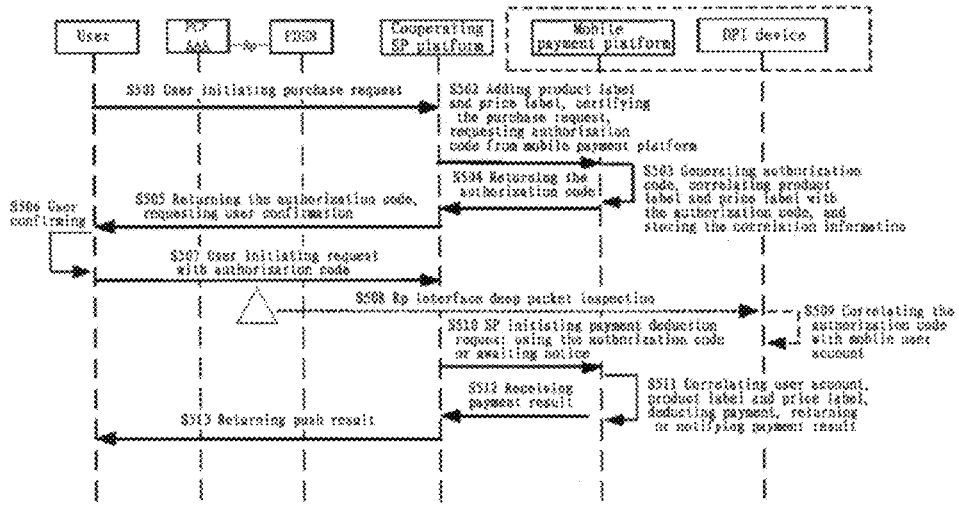
FIG. 7 is a timing diagraph corresponding to the system application of FIG. 6.

Application of the Payment Method and System of the Present Invention in a PDSN Packet Switch Network (See FIG. 6 and FIG. 7)

In FIG. 6, the interface between PCF and PDSN in a PDSN packet switch network is called an Rp interface. The Rp interface uses a splitter or mirror image technique to replicate data streams in the communication network by a splitter unit or a mirror image unit. The replicated data streams may be directed to the DPI device or transmitted to the DPI device via a distribution/aggregation unit.

In FIG. 7, steps S501-S507 are same as steps S401-S407 in FIG. 5.

At step S508, the DPI device performs Rp interface deep packet inspection after receiving the payment request message. The deep packet inspection is performed in the following manner: the network packet capturing unit transmits instruction data packets contained in sampled data packets to the instruction processing unit; the instruction processing unit extracts the user's MSISDN, IMEI, IMSI or another form of mobile terminal number representing the user's identity; the network packet capturing unit transmits user data packets contained in sampled data packets to the user data packet processing unit; the user data packet processing unit the extracts the authorization code.

Steps S509-S513 are same as steps S409-S413.

Embodiment 5

Figure 8:
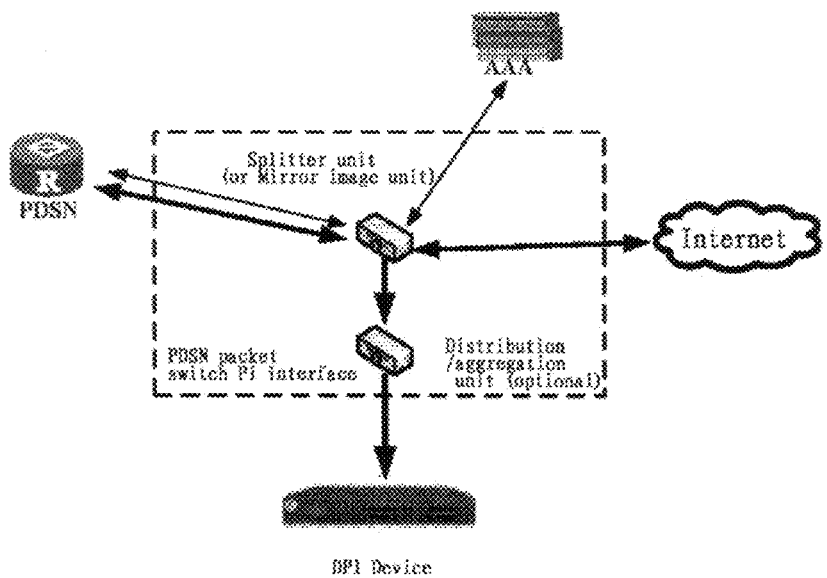
FIG. 8 is a diagram showing another application of the method and system for payment based on correlation between product specific information and terminal numbers in accordance with the invention in a PDSN packet switch network.
Figure 9:
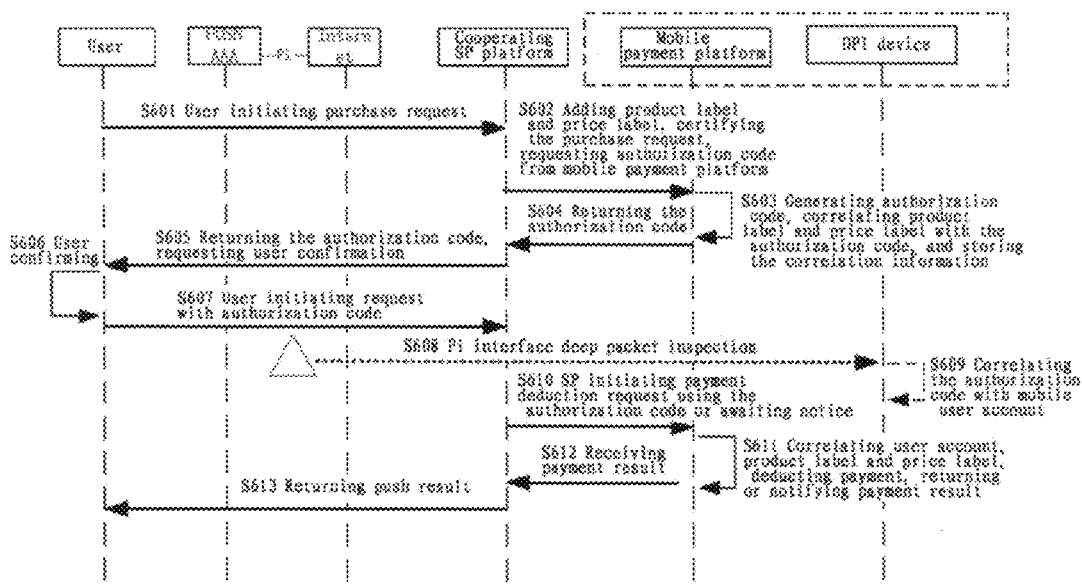
FIG. 9 is a timing diagraph corresponding to the system application of FIG. 8.

Another Application of the Payment Method and System of the Present Invention in a PDSN Packet Switch Network (see FIG. 8 and FIG. 9)

In FIG. 8, the interface between AAA server and PDSN in a PDSN packet switch network is called a Pi interface. The Pi interface uses a splitter or mirror image technique to replicate data streams in the communication network by a splitter or a mirror image unit. The replicated data streams may be directed to the DPI device or transmitted to the DPI device via a distribution/aggregation unit.

In FIG. 9, steps S601-S607 are same as steps S401-S407.

At step S608, the DPI device performs Pi interface deep packet inspection after receiving the payment request message. The deep packet inspection is performed in the following manner: the network packet capturing unit transmits instruction data packets contained in sampled data packets to the instruction processing unit; the instruction processing unit extracts the user's MSISDN, IMEI, IMSI or another form of mobile terminal number representing the user's identity; the network packet capturing unit transmits user data packets contained in sampled data packets to the user data packet processing unit; the user data packet processing unit the extracts the authorization code.

Steps S609-S613 are same as steps S409-S413.

The above-discussed are preferred embodiments for illustrating the present invention only, but are not meant to limit the present invention. Although the present invention has been described in details by reference with the embodiments above, it should be understood that a skilled person can appropriately modify the technical solutions illustrated above or substitute technical features with equivalents. Any simple modifications or equivalents based on the principle of the invention are still within the spirit and scope of the invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of using a computer with a processor and a memory to make a payment based on correlation between product specific information and terminal numbers, comprising:

providing product specific information representing payment information for goods selected by a user from a web service;

dispatching the product specific information for the selected goods to the user;

receiving a payment request message containing the product specific information, the payment request message sent from a terminal device of the user;

obtaining the product specific information from the payment request message;

obtaining a terminal number associated with the terminal device of the user from a communication network; and correlating the terminal number and the product specific information and providing the correlation information to a payment platform, wherein the terminal number represents identification information of the user and may be used by the payment platform to search for an account of the user, and the product specific information may be used by the payment platform to deduct payment from the account of the user; and wherein at least one of the foregoing steps is performed using a computer with a processor and a memory.

2. The method of claim 1, wherein the product specific information comprises at least one of fee information, product information, manufacturer information, labeling information and discount information for the selected goods.

3. The method of claim 1, wherein the product specific information is conveyed in the payment request message in an encrypted format, in a token, or in a payment certificate.

4. The method of claim 1, wherein the terminal number comprises a mobile phone number, an International Mobile Subscriber Identification (IMSI) number, an International Mobile Equipment Identity (IMEI) number, an Asymmetric Digital Subscriber Line (ADSL) account, or a Wireless Local Area Networks (WLAN) account.

5. The method of claim 1, wherein the communication network comprises a General Packet Radio Service (GPRS) core network, a Code Division Multiple Access (CDMA) packet switch service node, a Packet Data Serving Node (PDSN) core network, an advanced (Long Term Evolution) LTE network, a DSLAN/Broadband Remote Access Server (BRAS)/Radius network, or a Wireless Local Area Network (WLAN) AC (Access Controller)/AP (Access Point)/BRAS (Broadband Remote Access Server)/Radius (Remote Authentication Dial In User Service) network.

6. The method of claim 1, wherein said obtaining a terminal number comprises:

providing the terminal number by an existing network device in the communication network; or inspecting data packets transmitted in the communication network by a deep packet inspection (DPI) device provided in the communication network based on a splitter or mirror image technique, and obtaining the terminal number from inspected user instruction packets.

7. The method of claim 6, wherein the network device comprises a Gateway GPRS Support Node (GGSN), a Packet Data Serving Node (PDSN), a Radius, or a Wireless Application Protocol (WAP) gateway.

8. A system for making a payment based on correlation between product specific information and terminal numbers, comprising:

a computer having a processor and a memory in communication with the processor; the computer having:

a product specific information providing module for providing a user with product specific information representing payment information for goods selected by the user from a web service;

a dispatching module for dispatching the product specific information for the selected goods to the user;

a correlation module for receiving a payment request message sent from a terminal device of the user, the payment request message containing the product specific information, obtaining the product specific information from the payment request message, obtaining a terminal number associated with the terminal device of the user from a communication network, correlating the terminal number and the product specific information, and providing the correlation information to a payment platform, wherein the terminal number represents identification information of the user and may be used by the payment platform search for an account of the user, and the product specific information may be used by the payment platform to deduct payment from the account of the user.

9. The system of claim 8, wherein the product specific information providing module comprises:

a request sub-module for, after receiving a request message from the dispatching module requesting product specific information for the selected goods, generating product specific information representing payment information for the selected goods and outputting the product specific information to the dispatching module; and a storage sub-module for storing the product specific information output by the request sub-module.

10. The system of claim 8, wherein the payment platform comprises a mobile payment platform, a bank payment platform, or a third party payment platform.

* * * * *